C. G. HAWLEY & E. K. BAKER.
DEMOUNTABLE WHEEL RIM.
APPLICATION FILED JUNE 10, 1909.
1,101,741.  Patented June 30, 1914.
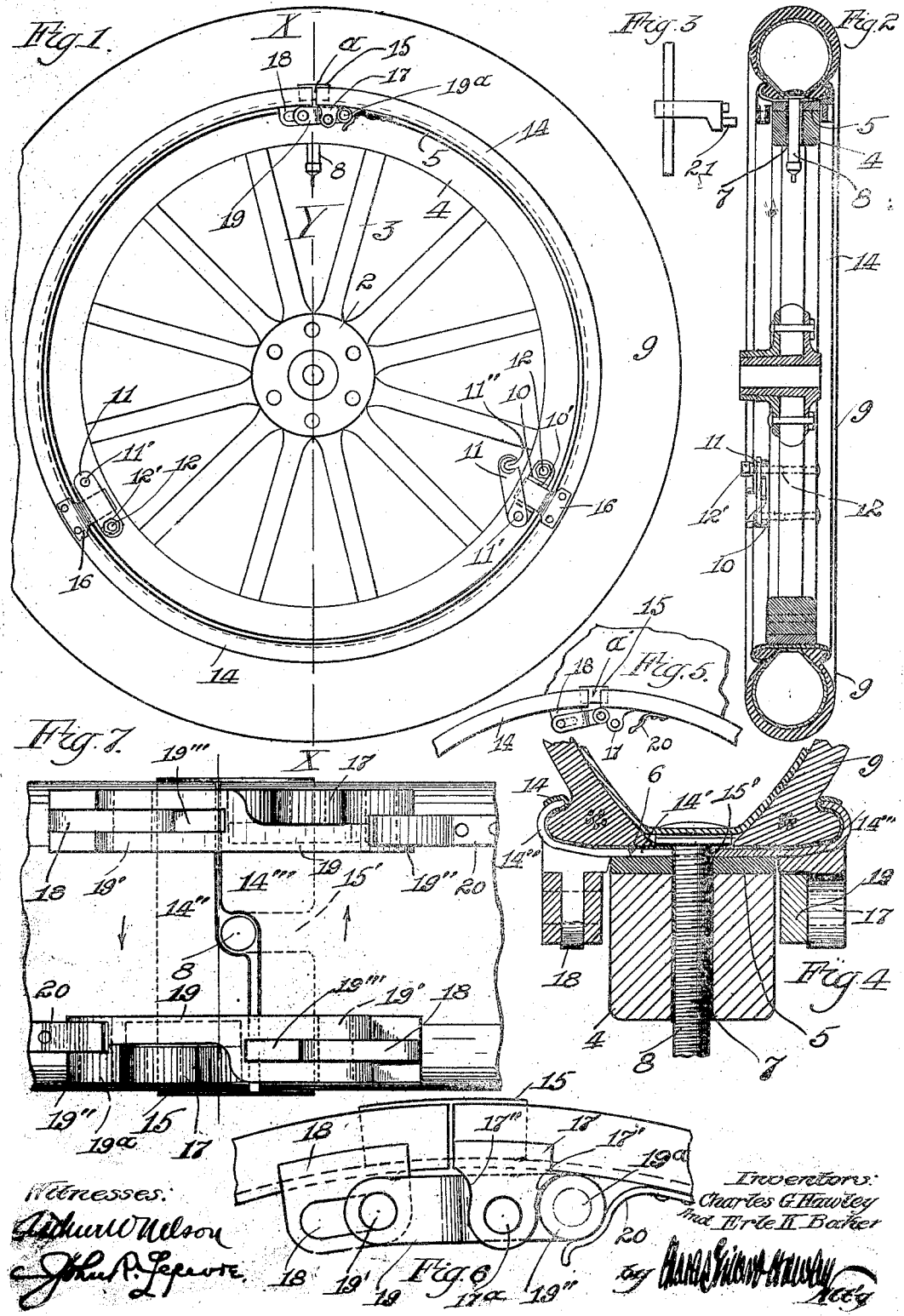

UNITED STATES PATENT OFFICE.

CHARLES GILBERT HAWLEY AND ERLE KING BAKER, OF CHICAGO, ILLINOIS, ASSIGNORS TO UNIVERSAL RIM COMPANY, A CORPORATION OF ILLINOIS.

DEMOUNTABLE WHEEL-RIM.

1,101,741.  Specification of Letters Patent.  Patented June 30, 1914.

Application filed June 10, 1909. Serial No. 501,245.

*To all whom it may concern:*

Be it known that we, CHARLES GILBERT HAWLEY and ERLE KING BAKER, citizens of the United States, and residents of Chicago, Cook county, Illinois, have invented certain new and useful Improvements in Demountable Wheel-Rims, of which the following is a full, clear, and exact description.

Our invention relates to improved means for mounting or securing tires upon wheels of automobiles and the like, and has especial reference to improvements in so-called demountable rims of the class adapted to carry inflated tires and to be quickly mounted upon and demounted from wheels.

The object of our invention is to provide a structure that will enable the quick placing of a preinflated tire upon an automobile wheel; which will insure the retention thereof on the wheel; and which will admit of the quick and easy exchange of an old or deflated tire for an inflated tire.

Another object of the invention is to provide a quickly demountable rim structure that shall be adapted for use with both ordinary expansible bead tires and so-called quick detachable tires, i. e. or inexpansible bead tires.

A further object of the invention is to provide a demountable rim that may be easily and quickly inserted in or removed from a tire.

Another object of the invention is to so improve the means used to hold the rim against rotation and lateral movement on the wheel that minimum expansion and contraction shall be required in the operation of the demountable rim, thereby adapting such a rim to use with so-called quick detachable or non-expansible bead tires.

A further object of the invention is to provide a demountable rim and complementary wheel which may be assembled and also separated by the manipulation of a minimum number of parts, none of which need be removed from their places.

Still further objects of the invention will appear hereinafter.

Our invention consists in various novel constructions and combinations of parts, all as hereinafter described and particularly pointed out in the appended claims; and will be readily understood by reference to the accompanying drawings, which form part of this specification.

In the drawings: Figure 1 is a side view of an automobile wheel constructed in accordance with, and provided with a demountable rim embodying, our invention. Fig. 2 is a sectional view on the line X—X of Fig. 1; Fig. 3 shows the tool or wrench which we provide for operating the rim; Fig. 4 is an enlarged sectional detail on the line X—Y of Fig. 1; Fig. 5 is a detail view showing the rim expanded; Fig. 6 is an enlarged side view of the operating and locking device, taken from Fig. 1. Fig. 7 is an enlarged plan view of the inner side of the rim, showing the relations of the two locking devices and the formation of the ends of the rim.

The device herein shown is known as a demountable rim. Technically considered it serves as the medium of connection between the pneumatic tire and the wheel. Our rim, though it constitutes in itself a complete device for carrying a tire and is also a complete preinflated tire carrier, is nevertheless, in another sense incomplete without the wheel, for the reason that certain auxiliary parts are required upon both the rim and the wheel, to adapt them for quick connection and disconnection. As hereinafter described the rim taken by itself comprises the rim proper and the several parts which it carries and the wheel will be described as made up of the hub, spokes, felly and felly band. It will at once be understood that although our invention is usually applied to wooden wheels, it is equally well adapted for use with metallic wheels.

Referring now to the particular structure shown in the drawings, 2, represents the wheel hub, 3, the spokes, 4 the felly, and 5, the felly band. The felly and band are shown in cross section in Fig. 4, from which it will be seen that the band is a metal band, which is substantially rectangular in cross section, the same providing the wheel with a flat or cylindrical periphery, 6. The rim, when in use is firmly seated on this periphery, as hereinafter described. At one point the felly and felly band contain a hole, 7, to receive the valve stem, 8, of the pneumatic tire, 9. This hole is located centrally or midway in the felly. At one or more (preferably two points), the wheel is provided with rim fastenings or latches, each of which preferably comprises a plate, 10, a swinging bar or hasp, 11, and a bolt, 12. The plate contains a recess, 10', to receive a lug which projects from the rim and the hasp, 11, is adapted to swing down over the lug and secure it to the side of the wheel. One end of the hasp is attached to the wheel and plate, 10, by a rivet, 11', and the other end is provided with a notch, 11'', to fit the bolt in the other end of the plate, 10. The hasp is fastened in place by tightening the bolt against the same. It is not necessary to remove the bolt from the wheel when the hasp is to be swung back out of the way. At such times the bolt is only loosened enough to free the hasp. The danger of losing parts is thus avoided.

Our rim, 14, as here shown is of ordinary flanged, clencher form in cross section, having a main or middle portion, 14', that is flat or cylindrical. This middle portion is adapted to seat firmly on the wheel felly periphery as shown in Figs. 2 and 4. The exact shape of the flanges of the rim is not material for our invention admits of the use of rims of various cross sections having flanges of various kinds and forms, suited to different tires and different uses to which they are to be put. The rim is split or cut transversely at one point (a) and may therefore be opened and closed after the manner of a split ring. We do not use a straight or perpendicular cut across the rim, but in effect arrange the cut at an inclination to the edges thereof, preferably as shown in Fig. 7. We do this to facilitate the passing of one end of the rim by the other end, at times when the rim is contracted, for insertion in or removal from the base beads of the tire. As shown in Fig. 7 the ends, 14'' and 14''' of the rim are formed on irregular lines, each being provided with a relatively projecting part. The projections on the ends are relatively staggered, and as here shown interlock with the valve stem, 8, for which sufficient space is left between the said ends or projections. Such formation permits the ends of the rim to be displaced in the directions of the arrows in Fig. 7; so that the long parts are relatively overlapped and the short ends are brought together to reduce the effective circumference of the rim. This facilitates the placing of the rim in the tire; and its removal therefrom, also the positioning of the valve stem between the ends of the rim. The opening or gap between the ends of the rim may be closed by a bridge plate, 15, which conforms to the shape of the inner surface of the rim. The plate is provided with a notch, 15', (see dotted lines, Fig. 7, and full lines Fig. 4) which allows the bridge to be pushed back on one end of the rim when the tire and rim are being put together. When both ends of the rim have been properly placed on the base of the tire and before the tire is fully inflated, the bridge is shifted into the other end of the rim to properly bridge the gap. The bridge plate with the valve stem completely closes the gap in the rim and prevents the rubber tire or its inner tube from sinking into the gap. The bridge plate at all times substantially retains its mid relation to the two ends of the rim and is most effective when the gap, a, is widened by the expanding of the rim as shown in Fig. 5. 16—16 are the rim lugs hereinbefore referred to. These lugs are fastened to the outer flange of the rim and are so placed that when the rim is put on the wheel they fall into the notches of the plates, 10, thereon. The lugs are preferably somewhat narrower than the notches to allow slight freedom of movement but nevertheless assist the valve stem to hold the rim against rotation on the wheel; when secured by means of the hasps, 11, the lugs also prevent lateral movement of the rim on the wheel.

The rim may be easily placed on or removed from the wheel when the rim is slightly expanded and thereby enlarged in circumference. Likewise it may be firmly bound or secured by contracting it on the wheel. For these purposes we preferably use two operating and locking devices of a toggle lever like nature. These devices engage opposite sides of the wheel felly when the rim is in place on the wheel and also serve to prevent lateral movement of the ends of the rim with relation to each other and the wheel. We prefer that the operating and locking devices shall occupy reverse positions upon the rim so that their operating directions shall be the same on the two sides of the rim, and to avoid confusion as to the direction in which either end of the rim should be moved to separate it from the other in taking the rim out of the tire. Each locking device here shown comprises two lugs, 17 and 18 on the adjacent ends of the rim together with a link, 19, and a spring, 20. The lug, 17, is preferably round at the end and is provided with concavities, 17' and 17'', into which the end of the link is adapted to snap. The lug, 18, contains a slot, 18', for the pin, 19', of the link. The pin and slot constitute a lost motion device, and by properly proportioning the pin and slot the range of motion may be fixed and accordingly the degree of expansion and contraction of the rim may be gaged and adjusted to suit working conditions. One end of the link is provided with a round boss, 19'', to coact with the lug, 17, and the other end is bifurcated to engage the sides of the lug, 18. The bifurcated end contains the pivot pin, 19'. The slot or opening 19''' in the end or fork of the link is of sufficient length to permit the described movement of the pivot pin in the lug, 18. The spring, 20, performs the function of locking, or holding, the link in locked condition. (See Figs. 1, 6 and 7.) While the lug, 17, and the bossed or hooked end of the link might be provided with projecting portions for engagement with the wrench, we prefer to form them with holes, 17ª and 19ª, respectively, and employ a wrench of the kind shown in Fig. 3; the same having pins, studs, or pintles, 21, adapted to enter the holes, 17ª and 19ª. When the wrench is thus positioned it constitutes an operating link or crank between the link, 19, and the lug, 17. The device as a whole at such times operates after the manner of a toggle and by swinging the wrench through substantially half a circle, the end of the link may be moved downward beneath the lug, 17, and transferred from one side thereof to the other. Such movement of the link, in one direction, obviously increases the distance between the lugs, 17, and 18, and hence between the ends of the rim, the movement actually imparted being the difference between the throw of the link, 19, and the length of the slot in the lug, 18. Movement of the link in the other direction serves to draw the ends of the rim together. We so adjust or form the parts that the expansion due to the operation of the locking device does not exceed the expansion that is obtainable within a non-stretchable-bead tire. This much expansion is sufficient to allow the rim to be placed on or removed from the wheel.

To detach the tire and rim from the position on the wheel, shown in Fig. 1, the operator first loosens the nuts, 12', and swings back the hasps, 11, to free the lugs, 16, of the rim. He then applies the tool to the operating device placing the prongs, 21, in the holes 17ª and 19ª thereof; and by a partial turn of the tool, disengages one of the links from the rim lug, 17. The tool is then applied to the locking device on the opposite side of the wheel and is retained in the parts until by a complete movement of the wrench or tool, the rim is expanded to the condition depicted in Fig. 5. It should be understood that at such times the tire is usually deflated and the rim having been relieved from the pressure of the tire is not difficult to expand. The expansion of the rim frees it from the periphery of the wheel and the operator then pulls the rim from the wheel at the point opposite the valve stem; whereupon the rim and tire may be easily lifted off the wheel, the valve stem withdrawing through the hole in the felly. The placing of an inflated tire on the wheel is accomplished in the reverse manner, the operator first entering the valve stem in the hole in the felly, whereupon the rim will drop down into position with the two locking devices astraddle of the wheel. The lower part of the rim may then be pushed into place on the wheel, the lugs, 16, serving as stops to limit its swinging movement. When the lugs have been thus positioned against the wheel the operator applies the wrench to the open locks (Fig. 5) and operates them successively, to contract and fasten the rim on the wheel, after which the safety fastenings, 11, are secured over the rim lugs. To remove the rim from a tire the locking links are disconnected and one end of the rim is pulled out of line with the other; that is displaced laterally in a plane parallel to the axis of the rim as contrasted with coiling in a plane perpendicular to said axis, in which condition the rim may be very easily contracted as required to withdraw it from the beads of the tire,—the mounting of a tire on the rim is accomplished in much the same way,—no effort is made to hold the rim in contracted condition, for this purpose, but generally a pry bar, such as a long screw driver, is used to force the last end of the rim into place.

The ease with which our rim may be put into and taken out of a tire is a most important factor. In the operation, one rim end is moved out of circumferential alinement with the other, as contrasted with the coiling of the rim in its own plane which requires more force. And at such moments our rim takes on a helical form that greatly facilitates the stripping of the rim from the beads of the tire and reversely, when one end of the rim is placed on the beads, the temporary helical form of the rim permits the remainder of rim to be engaged therewith progressively beginning at the first engaged end, without the aid of contracting tools.

Our invention is adapted for use with all kinds of tires, but as stated it is especially adapted for pneumatic tires having non-stretchable base beads, which because of the small margin of difference in the diameters of the tire and rim, are the most difficult to handle. The tire, 9, shown in the drawings is of the non-stretchable kind, as indicated by the cables, 9', in the base of beads thereof (see Fig. 4). Tires of this kind are but slightly larger than the rims intended to receive them. A rim like ours is no exception to the rule that when the parts are in working condition the rim should very closely fit the tire. It follows that the proportions of our wheel and rim are such as to comply with this rule and in practice we successfully operate our rims with a circumferential expansion ranging from three-sixteenths of an inch to a maximum that is considerably less than one-half inch. We are able to do this because our wheel and rim have no projections or operating parts that require greater expansion than is permitted by a non-stretchable tire.

It should be clearly understood that our invention in the form here shown is a rim in the form of a split ring which is adapted to be forced or clamped upon the wheel by the pressure of an inflated pneumatic tire. This force insures the holding of the rim and wheel in firm engagement. It should also be noted that our locking and operating device is so constructed that it permits the rim to constantly contract on the wheel, after it has been contracted thereon by means of the taking device; in other words, the locking device while it prevents such expansion of the rim as would permit it to leave the wheel, does not prevent the desirable contraction of the rim which is essential to the automatic taking up of the wear between parts, also expansion and contraction due to heat. Our locking device is a safety mechanism which prevents accidental loss of the rim when the tire is deflated and no longer clamps the rim. In other respects the locking device fulfils the office of a convenient operating device by which the rim may be quickly expanded and contracted in exchanging tires. The locking device also performs the important function of locking or holding the rim in expanded condition under the pressure of a pre-inflated tire, such being the condition in which our rims and tires are generally carried upon automobiles in readiness to take the place of a deflated tire. The locking device herein shown also serves to firmly hold the two ends of the rim against accidental lateral displacement on the wheel.

As various modifications of our invention will readily suggest themselves to one skilled in the art we do not limit or confine the invention to the specific structure herein shown and described.

Having thus described our invention we claim as new and desire to secure by Letters Patent:—

1. An integrally flanged demountable tire carrying rim opened at one place by a transverse cut extending from a point on one edge of the rim to a circumferentially advanced point on the other edge of the rim, for the purpose specified.

2. An integrally flanged and transversely split demountable tire carrying rim in which the opposed ends substantially conform to a line extending from a point on one edge of the rim to a circumferentially advanced point on the other edge thereof, in combination with means for securing said ends together in alinement.

3. An integrally flanged and transversely split demountable tire carrying rim in which the opposed rim ends substantially conform to a staggered line extending from a point on one edge of the rim to a circumferentially advanced point on the other edge thereof.

4. An integrally flanged and transversely split demountable tire carrying rim in which the opposed ends substantially conform to a staggered line extending from a point on one edge of the rim to a circumferentially advanced point on the other edge thereof, in combination with means for securing the said ends together in alinement.

5. An integrally flanged demountable tire carrying rim opened at one place by a cut which extends from a point on one edge of the rim to a circumferentially advanced point on the other edge and which is staggered to form shoulders which obstruct the separation of the rim ends.

6. An integrally flanged demountable tire carrying rim opened at one place by a transverse cut containing a valve stem space or hole and extending from a point on one edge of the rim to a circumferentially advanced point on the other edge of the rim, for the purpose specified.

7. An automobile wheel in combination with an integrally flanged transversely split demountable tire carrying rim, means engaging opposite sides of the wheel and rim at the rim split and securing the rim ends together and preventing their lateral movement on the wheel and clamps on the side of the wheel and spaced from said split and securing the rim against lateral movement thereon.

In testimony whereof, we have hereunto set our hands, this 5th day of June, 1909, in the presence of two subscribing witnesses.

CHARLES GILBERT HAWLEY.
ERLE KING BAKER.

Witnesses:
M. SIMON.
O. WARNY.